United States Patent Office 3,592,737
Patented July 13, 1971

3,592,737
PURIFICATION AND FRACTIONATION OF PROTEASE AND AMYLASE ACTIVITIES IN ENZYME MIXTURE
Leonard Keay, Florissant, and Richard G. Anderson, Ferguson, Mo., assignors to Monsanto Company, St. Louis, Mo.
No Drawing. Filed Aug. 14, 1968, Ser. No. 752,459
Int. Cl. C07g 7/02
U.S. Cl. 195—66R
23 Claims

ABSTRACT OF THE DISCLOSURE

Addition of soluble calcium salt, such as calcium acetate, at moderately high levels, e.g., about 1–2% weight/volume, to an enzyme solution, e.g., a clarified fermentation beer, or aqueous solution of redissolved solids precipitated from such beer, containing protease or amylase together with proteinaceous impurities, precipitates proteinaceous impurities directly without removing enzymes from solution. Addition of solvent prior to, concurrently with, or after calcium salt precipitation, precipitates amylase from solution. Addition of further solvent precipitates protease from solution. Allows convenient removal of proteinaceous impurities, isolation of amylase in an amylase-rich fraction with or without the calcium salt precipitated impurities, as desired, and isolation of protease and, thus permits both purification and fractionation of the enzymatic activity in a convenient manner.

BACKGROUND OF THE INVENTION (1) Field of invention

Enzymes: Purification of enzyme solution. Removal of proteinaceous impurities and fractionation into amylase-rich and protease-rich fractions.

(2) Prior art

Production of protease by Bacillus microorganisms is known. Removal of proteinaceous impurities presents a problem. When such enzyme products contain amylase and proteinaceous impurities in addition to protease, separation and purification is difficult. It is especially difficult to remove proteinaceous impurities and amylase from the protease, when this is the desired objective.

The prior art has mentioned addition of a soluble calcium salt to aqueous enzyme extracts of the type here concerned, but has not reported precipitation of proteinaceous or other impurities upon such addition. Moreover, upon addition of solvent to such a starting aqueous enzyme extract, the prior art has not reported precipitation of amylase. Lead acetate treatment and ammonium hydroxide adjustment of pH has been required to precipitate proteinaceous impurities in prior art procedure. Amylase has been precipitated according to prior art procedure by the employment of ammonium sulfate and ammonium hydroxide to elevate the pH of an aqueous solution which has already been considerably purified by relatively complex procedure.

Thus, according to the procedure of U.S. Pat. 3,031,380, calcium acetate solution (0.5%) is added to the beer filtrate, but only in amounts of 7 to 10 ccs. per 500 ccs. of a water solution of the enzyme. The purpose of this prior art procedure has been to stabilize the enzymes in solution, rather than precipitate impurities or other material, and no mention of a precipitate of impurities or otherwise appears in the reported procedure of this patent until lead acetate plus ammonium hydroxide are added. In the reported procedure, amylase is precipitated only far along in the process, in water, using ammonium sulfate and ammonium hydroxide, which procedure has incidentally not been found to effect a very satisfactory separation of amylase from protease since considerable protease also comes down in the precipitate from such treatment.

It is apparent that the procedure of the prior art is not a simple procedure and its effectiveness leaves much to be desired.

It would be highly desirable to provide a simplified and improved process whereby the proteinaceous impurities could be conveniently removed directly from a filtered or centrifuged beer or from an enzyme solution prepared by redissolving enzyme solids precipitated by addition of solvent to a fermentation beer. It would also be highly desirable to have available a simple and effective procedure for such purification including removal of amylase from such a solution of a mixture of enzymes including amylase and protease, and which would permit the fractionation of amylase and protease if desired. It would be most desirable if such fractionation could be effected in a clean and efficient manner giving rise to amylase and protease fractions exhibiting a minimum of cross-contamination.

It is well known that various enzymes have various different activities or capacities. For example, amylase is active in starch digestion. Protease, on the other hand, is effective in the digestion of protein material by hydrolysis or bond-splitting activity, neutral protease being active at substantially neutral pHs whereas alkaline protease is active at more alkaline pHs. When in combination, the various enzymes are frequently subject to autodigestion or endogenous deterioration. For this reason, and also because it is highly desirable to have specific enzymes available for use in various specific applications, the desirability of having the individual enzymes, as well as efficient methods for the separation of enzyme mixtures into their individual components, is readily apparent.

SUMMARY OF THE INVENTION

The present invention involves treatment of an enzyme solution, preferably a protease and/or amylase-containing solution, such as obtained by filtration or centrifugation of a fermentation beer, or a solution of redissolved enzyme solids as obtained by precipitation using an excess of water-miscible organic solvent in which the enzymes are not soluble, with a soluble calcium salt, thereby to selectively precipitate proteinaceous impurities from the solution. The starting solution is preferably water-clear, but is not necessarily so, since precipitation of the proteinaceous materials using a soluble calcium salt results in a substantial purification, as does optional subsequent processing according to the invention.

After precipitating proteinaceous impurities using the soluble calcium salt, which is employed at a moderately high level, any amylase present may be precipitated either after removing the precipitate or without prior removal of the precipitate, as desired, by addition of a sufficient amount of an organic solvent which is water-miscible and in which the amylase is itself not soluble. This causes precipitation of the amylase at an earlier stage than the protease. The amylase may then be separated or discarded, as desired. Addition of further solvent to the residual solution effects precipitation of the desired protease fraction, of improved purity, substantially free from amylase, and careful operation involving removal of proteinaceous impurities, precipitation of amylase, and finally precipitation of protease, allows fractionation of the amylase and protease with little or no cross-contamination. An alternate mode of procedure involves adding the solvent first to precipitate amylase, and then adding the soluble calcium salt to effect precipitation of proteinaceous impurities, or adding both solvent and soluble calcium salt together, which procedure is recommended only where purity of the precipitated amylase is not of interest.

The process of the invention allows a clean, efficient removal of proteinaceous impurities and enzyme fractionation, which cannot be achieved by using ammonium sulfate fractionation, tannic acid precipitation according to U.S. Pat. 3,147,196, coprecipitation with lead hydroxide according to the procedure of U.S. Pat, 3,031,380, coprecipitation with barium sulfate, treatment with calcium phosphate gel, or treatment with hydroxylapatite. The process accordingly permits removal of proteinaceous impurities and recovery of purified protease, or fractionation of amylase and protease contained in the starting solution with facility, and is a striking and unpredictable advance in the art. Polysaccharides and impurities associated therewith are not eliminated from the enzymes by the process of the invention, and other or additional procedure must be applied for this purpose, unless these materials are removed prior to application of the present process.

OBJECTS

The provision of a process having any or all of the above-enumerated advantages is an object of the invention. Additional objects will become apparent hereinafter, and still others will be obvious to one skilled in the art.

GENERAL DESCRIPTION OF THE INVENTION

The starting material in the process of the present invention is an enzyme or mixed enzyme solution such as a clarified fermentation beer or an aqueous extract of an enzyme mixture. The latter may be obtained by redissolving the crude solid enzyme mixture obtained by precipitation from a clarified fermentation beer using an excess of water-miscible organic solvent, such as isopropanol or acetone, in which the enzyme mixture is insoluble. If a fermentation beer is employed, it is preferably clarified as by filtration or centrifugation, but the starting solution need not be water-clear, that is, it need not be free of solids visible to the naked eye. Additional processing may be effected upon this solution to remove other enzyme materials and undesired impurities, if desired.

The invention can also be applied to any other aqueous solution of amylase, protease, or protease and amylase, together with undesired proteinaceous impurities, and employment of a soluble calcium salt for precipitation of undesirable proteinaceous impurities may obviously be applied to a protease-containing solution from which the amylase has already been removed. As already pointed out, this may be conveniently effected by reversing the order of steps in the process and precipitating the amylase by employment of an organic solvent before the soluble calcium salt is employed for precipitation of undesirable protein impurities.

The essential steps in the process are as follows:

(1) Addition of soluble calcium salt at a moderately high level to precipitate proteinaceous impurities not containing enzymatic, e.g., amylase or protease activity.

(2) Addition of water-miscible organic solvent in which the protease or enzyme mixtures are insoluble but which do not inactivate or denature the enzymes, to precipitate amylase, when present, and (3) Addition of further organic solvent to precipitate both neutral and alkaline protease.

It is obvious that Step (2) can be carried out either with or without previous removal of the precipitate from Step (1), depending upon whether or not it is desired to recover amylase. It must, however, be carried out before Step (3). It is also apparent that precipitation of amylase according to Step (2) can be carried out before addition of the soluble calcium salt according to Step (1), or together therewith, in which case the precipitated amylase will be relatively impure and the proteinaceous impurities may be present in the solution from which the amylase has already been precipitated, depending upon the sequence employed. Obviously, Steps (1) and (2) can be carried out concurrently resulting in precipitation of both amylase and proteinaceous impurities in a single step, if desired.

Thus, the calcium salt can be added first, followed by filtration or centrifugation or not, to remove precipitated impurities. Alternatively sufficient solvent may be added first to precipitate amylase and then impurities precipitated by addition of soluble calcium salt. Or, the two can be added together to give an impure amylase precipitate. When it is desired to remove precipitate from any step, this may be effected by filtration, centrifugation, combinations of the same, or established alternate physical procedures.

Addition of the calcium salt effects removal by precipitation of impurities which are not removed using organic solvent alone, whether addition of calcium salts is carried out as a first or second step in the process. The addition of soluble calcium salt prior to or during the solvent fractionation permits fractionation of amylase and protease to an extent which cannot be achieved by solvent fractionation in the absence of calcium salt.

The soluble calcium salt employed is preferably calcium acetate, although other soluble calcium salts may be used. These include the propionate, gluconate, chloride, and others. The soluble calcium salt is employed at a moderately high level, preeferably about 2% weight/volume, and may even be employed up to its limit of solubility in the starting solution, that is, up to about 10% weight/volume, but no advantage is apparent in employing quantities greater than about 2%. The minimum operative level appears to be about 0.5% weight/volume, with quantities of about 1 to 2% weight/volume being preferred.

The process is preferably carried out at reduced temperatures, for example, ten degrees centigrade or below, with 5° C. being convenient and readily attainable, but the process may be carried out satisfactorily at ambient room temperatures and efficiency appears to be only somewhat increased by operating at the lower temperature ranges.

The water-miscible organic solvent employed is one in which the enzyme mixture and or individual enzymes are not soluble, and which does not inactivate or denature the enzymes present. The solvent is preferably a polar solvent selected from the group consisting of lower-alkanols, for example, methanol, ethanol, propanol, isopropanol, lower-alkyl ketones, e.g., methyl ethyl ketone, acetone or the like, and cyclic ethers, e.g., tetrahydrofuran and dioxane. Isopropyl alcohol and acetone are preferred solvents.

When it is desired to precipitate the amylase present, only sufficient solvent is added to accomplish this result, without precipitating the protease which separates at a higher solvent concentration, and the amount ordinarily sufficient to precipitate the amylase is between about 0.6 and 1.0 volume of solvent per volume of starting solution, with frequently no more than 0.8 volume of solvent being required.

Addition of further organic solvent, as already stated, precipitates protease, both neutral and alkaline, and this precipitation is usually effected satisfactorily by employment of an additional 0.5–1.0 volumes of solvent based upon the volume of starting solution, for a total of 1.1–2.0 volumes. Lesser or greater amounts of solvent may be employed to precipitate the protease, but in the higher ranges additional impurities appear in the precipitate and, at the lower ranges, all of the protease activity may not be effectively precipitated. The stated volumes of solvent therefore appear to represent the optimum for precipitation of the protease or protease-rich fraction.

For best results, addition of water-miscible organic solvent (in which the enzymes are insoluble but which does not inactivate or denature the enzyme) to the clarified beer or other enzyme solution should preferably be a slow addition, and advantageously even a dropwise addition, in order to effect most satisfactory fractionation between amylase and protease. Moreover, the organic solvent should preferably be cold. In addition, the starting enzyme-containing solution should also preferably be cold. Further, addition of organic solvent to the enzyme-containing solution should preferably be made with vigorous stirring or other agitation of the enzyme-containing solution. Thus, under most advantageous conditions, addition of solvent to the enzyme-containing solution will be slow, preferably dropwise, both solvent and solution will be cold, and vigorous agitation will be employed during solvent addition. Although cooling to any temperature below room temperature has been found somewhat advantageous, it is desirable for best results that solvent and starting enzyme-containing solution be chilled to 10° C. or below, and about 5° C. has been found an extremely useful, attainable, and operative temperature for carrying out the process of the present invention.

The pH of the starting enzyme-containing solution will usually be about 5.5 to 7, preferably about 6 to 6.5, a readily attainabile pH range if not a normal pH range for the starting enzyme-containing solution.

Starting enzyme-containing beers can be obtained from microbial fermentation, e.g., production of enzymes by bacteria, using well-known fermentation methods such as those generally described in Kirk-Othmer, Encyclopedia of Chemical Technology 8, 173–204.

The exact activity of the mixture of enzymes employed as starting material depends on the method of preparation and is not critical to the present invention providing only that the starting solution has the desired proteolytic or amylolytic activity. Various analytical methods are available to determine the activity of enzymatically active material, for example, the protease activity of proteolytic enzymes can be determined by well-known casein digestion methods. According to such tests, a protease catalyzes the hydrolysis of casein for a certain period of time and temperature and at a certain pH; the reaction is stopped by the addition of trichloro-acetic acid, and the solution is filtered. The color of the filtrate is developed by a Folin phenol reagent, and the level of enzyme activity is measured spectrophotometrically in units of casein tyrosine. This method is more fully described in the Journal of General Physiology, 30, 291 (1947) and in Methods of Enzymology, 2, 23 by Academic Press N.Y. (1955). Amylase activity is generally determined by the well-known dinitrosalicyclic acid method of Bernfeld.

A particularly effective source of mixed enzymes which can be used as starting material in the present invention is a mutated *Bacillus subtilis* organism. The process for producing this organism and enzymes therefrom is described in U.S. Patent 3,031,380. A culture of this *Bacillus subtilis* (strain AM) organism has been deposited with the United State Department of Agriculture, Agricultural Research Service, Northern Utilization Research and Development Division, 1815 North University St., Peoria, Ill. 61604, and has been assigned No. NRRL B–3411. The enzymatically active material produced by this organism has been found generally to consist of two proteases, approximately 65–75% neutral protease (activity at pH of 7.0–7.5) and about 25–35% alkaline protease (activity at pH of 9 to 10). A significant amount of amylase is also present. There are generally about 700 thousand to about 1.2 million units of neutral protease activity per gram and about 250 thousand to about 400 thousand units of alkaline protease activity per gram of isolated solid as determined by Anson's variation of the Kunitz Casein digestion method. There are generally about 300 thousand to 350 thousand units of amylase activity per gram as determined by the Bernfeld method. As pointed out in the cited patent, the relative proportions of protease to amylase will vary depending on the exact conditions of growth of the microorganism, but we have found that the neutral and alkaline protease and the amylase will be produced, in at least some amounts, almost regardless of changes in the culture medium and other conditions of growth of the microorganism.

Another source of enzymes which can be used as starting material in accord with the present invention is *B. subtilis* strain NRRL 644, *B. subtilis* strain NRRL 941, and *B. subtilis* strain IAM 1523 (Japanese Culture Collection). Still other *B. subtilis* and other microorganisms are available which produce protease, a mixture of proteases, or protease and amylase, at least to a limited if not optimum extent.

DESCRIPTION OF THE PREFERRED EMBODIMENTS

The following preparations and examples are given by way of illustration only, and are not to be construed as limiting.

General outline of preparation of fermentation beer

A culture of *Bacillus subtilis* AM is inoculated into a sterile slurry of grains and other nutrient material (such as rice bran, corn meal, fish meal, wheat bran, Enzose (TM—about 50–80% dextrose and the balance higher saccharides, being the dried mother liquor remaining from dextrose manufacture by enzymatic hydrolysis of corn starch), distillers solubles, corn steep liquor, etc.) containing protein, carbohydrate, minerals, and growth factors. The vessel is agitated and aerated by bubbling sterile air through the inoculated slurry. The pH may be controlled or left to achieve its own natural pH. Aliquots of the beer are removed for assay at various times and, when enzyme production is apparently a maximum, the fermentation beer is then centrifuged and/or filtered prior to enzyme isolation.

Some details and examples of this type of enzyme production method are given generally in U.S. Pats. 2,530,210 of C. V. Smythe, B. B. Drake and C. E. Neubeck (to Rohm & Haas Company, Nov. 14, 1950), and 2,549,465 of J. C. Hoogerheide and E. G. Laughery (to Pabst Brewing Company, Apr. 17, 1951), and particularly in U.S. Pat. 3,031,380 of Apr. 24, 1962.

The foregoing procedure, especially that of U.S. Pat. 3,031,380, is productive of a fermentation beer containing the desired enzyme mixture. For clarification purposes to give a beer suitable for use as starting material, this fermentation beer may merely be centrifuged and/or filtered. Alternatively, the solid enzyme mixture may be precipitated by adding an excess of solvent, e.g., isopropanol or acetone, to the fermentation beer either without prior filtration or centrifugation or after a prior centrifugation and/or filtration, which is productive of a solid precipitate comprising an enzyme mixture, which may then be readily redissolved in water or aqueous solution to give an enzyme solution which may be used as starting material in the process of the invention. Obviously, the starting solution, by whichever procedure procured, may be subjected to additional centrifugation and/or filtration if desired to upgrade the quality of the starting enzyme solution.

As already stated, however, for purposes of the present invention the starting solution need not be water-clear, i.e., it need not be free of solids which are visible to the naked eye.

EXAMPLE 1

Removal of impurities from a solution of enzyme mixture-CaAc$_2$ only 5 gm. enzyme mixture (obtained by solvent precipitation from a *B. subtilis* AM fermentation beer) was stirred with 100 ml. distilled water, then 10 gm. calcium acetate was added and the mixture was stirred at room temperature for 15 minutes. The copious white insoluble material was removed by centrifugation. Recovery of protease in the supernatant was 95%.

EXAMPLE 2

Separation of amylase and protease by $CaAc_2$/acetone fractionation-acetone+$CaAc_2$ and further acetone 10 gm. enzyme mixture (obtained by solvent precipitation from a *B. subtilis* AM fermentation beer) was stirred in 100 ml. cold (5° C.) water for 15 minutes. 100 ml. cold (5°) acetone was added slowly with stirring followed by 2 gm. calcium acetate. After a further 15 minutes stirring the insolubles were removed by centrifugation. Then a further 100 ml. acetone was added slowly with stirring to the supernatant and this precipitate also collected. Both the first and second precipitates were reextracted with 100 ml. 0.1% calcium acetate. The reextracted first precipitate contained much insoluble material and was clarified by centrifugation. The extracted first precipitate contained 0.66 gm. protein, 100% of the amylase and 19% of the protease. The second acetone precipitate contained 0.67 gm. protein, 57% protease and only 7% amylase. The protease-rich fraction had much less pigment than the initial extract of the enzyme mixture.

EXAMPLE 3

Fractionation of enzyme mixture with calcium acetate/ acetone-acetone+$CaAc_2$ 10 gm. enzyme mixture (obtained by solvent precipitation from a *B. subtilis* AM fermentation beer) was stirred at 5° with 100 ml. water for 20 minutes. 100 ml. cold (5°) acetone was added slowly with stirring, followed by 2 gm. calcium acetate. The precipitate was collected by centrifugation (and resuspended for assay). The first precipitate contained 23% of the protease and 75% of the amylase. The yellow-orange supernatant obtained from the dark brown suspension contained no amylase and 62% of the protease.

EXAMPLE 4

Fractionation of enzyme mixture with calcium acetate/ acetone-acetone+$CaAc_2$ 10 gm. enzyme mixture (obtained by solvent precipitation from a *B. subtilis* AM fermentation beer) was stirred at 5° with 100 ml. water for 20 minutes. 60 ml. cold acetone was added with stirring followed by 2 gm. calcium acetate. The precipitate collected by centrifugation and resuspended for assay contained 68% amylase and 10% of the protease, while the light brown supernatant contained 79% of the protease and 32% of the amylase.

EXAMPLE 5

Removal of impurities and amylase from an enzyme mixture-acetone+$CaAc_2$ 100 gm. enzyme mixture (obtained by solvent precipitation from *B. subtilis* AM fermentation beer) was stirred in 1 liter distilled water at 5° for 30 minutes. 1 liter of cold (5°) acetone was added starting with stirring followed by 20 gm. calcium acetate. The mixture was stirred 30 minutes at 5° then centrifuged. The light brown supernatant contained no amylase and the protease recovery, as assayed in the supernatant, was 48%.

EXAMPLE 6

Separation of amylase and protease fractions from a fermentation beer by $CaAc_2$/isopropanol fractionation-isopropanol + $CaA_2$ and further isopropanol 100 ml. filtered fermentation beer was stirred at 5°. 80 ml. of isopropanol was added slowly with stirring followed by 2 gm. calcium acetate. The precipitate was removed and then 120 ml. isopropanol was added to the supernatant and the second precipitate collected. The first precipitate contained essentially all of the amylase, while the second precipitate contained 68% of the protease with essentially no amylase.

EXAMPLE 7

Removal of impurities and separation of amylase and protease in a fermentation beer by $CaAc_2$/acetone fractionation-$CaAc_2$, acetone, and acetone 100 ml. filtered fermentation beer was stirred at 25° C. and 2 gm. calcium acetate added. The precipitate was removed by centrifugation after stirring for 10 minutes. 80 ml. acetone was added to the supernatant. After stirring for 10 minutes a second precipitate was collected, and a third precipitate was isolated by the addition of a further 120 ml. acetone. The first precipitate contained essentially no amylase or protease. The second precipitate contained almost all of the amylase with little protease, while the third precipitate contained 65% of the protease with only about 5% of the amylase.

EXAMPLE 8

Removal of impurities, and separation of amylase and protease in a fermentation beer by $CaAc_2$/isopropanol fractionation-$CaAc_2$, isopropanol, and isopropanol 2 gm. calcium acetate was added with stirring to 100 ml. filtered fermentation beer, and after 10 minutes stirring the precipitate was removed by centrifugation. 100 ml. cold isopropanol was added with stirring to the supernatant and a second precipitate collected. A third precipitate was formed by addition of a further 100 ml. isopropanol and collected. The first precipitate contained a little protease (both neutral and alkaline) and amylase. The second precipitate contained almost all of the amylase, about 25% neutral protease and 5% alkaline protease. The third precipitate contained very little amylase, 70% of the neutral protease and 48% of the alkaline protease.

EXAMPLE 9

Removal of impurities and fractionation of amylase and protease in a fermentation beer by $CaAc_2$/acetone fractionation-$CaAc_2$, acetone, and acetone This experiment was carried out exactly as in Example 8, but using acetone instead of isopropanol. The first precipitate contained only trace amounts of enzymes, the second precipitate contained essentially all of the amylase with 8% neutral protease and 4% alkaline protease. The third precipitate contained 62% of the neutral protease, 65% of the alkaline protease and only a trace of amylase.

EXAMPLE 10

A clarified fermentation beer from the fermentation of *B. subtilis* var. amylosacchariticus, a known producer of neutral protease, is treated in the manner of Example 1. Similar purification and amylase protease separation are obtained.

The same results are obtained using a clarified fermentation beer from the other *B. subtilis* strains previously mentioned.

EXAMPLE 11

A clarified fermentation beer from the fermentation production of enzymes employing *B. thermoproteolyticus* var. Rokko, is treated in the manner of Example 1. The same purification is effected and substantially the same results are obtained as far as the protease separation. The product is thermolysin or thermoase which is separated by the final precipitation.

EXAMPLE 12

A synthetic mixture comprising a somewhat impure solution of amylase, neutral protease, and alkaline protease is prepared and adjusted to a pH of approximately 6. The product is treated in accord with the procedure of Example 9. Purification and fractionation of the solution into its amylase and protease fractions is readily effected.

EXAMPLE 13

Other calcium salts

In the same manner as given in Examples 1 and 3, impurities are removed from the protease-containing solution using calcium chloride, calcium gluconate, and calcium propionate instead of calcium acetate. The results are substantially the same as in Examples 1 and 3.

Although best results are obtained by the employment of isopropanol or acetone, as shown by the preceding examples, substantially the same results are obtained employing other lower-alkanols, lower-alkyl ketones, and cyclic ethers, as previously disclosed. It is only necessary that the organic solvent be water-miscible and that the enzyme not be soluble therein or denatured or inactivated thereby. Alkyl groups in lower-alkanols and lower-alkyl ketones employed preferably contain up to and including 4 carbon atoms. Other representative solvents which may be employed include methyl ethyl ketone, dioxane, and tetrahydrofuran. Also, as already mentioned, isopropyl alcohol and acetone are the preferred process solvents.

It is to be understood that the invention is not to be limited to the exact details of operation or exact compounds, compositions, or procedures shown and described, as obvious modifications and equivalents will be apparent to one skilled in the art, and the invention is therefore to be limited only by the full scope of the appended claims, including the application of the doctrine of equivalents thereto.

I claim:

1. Process for purification of an aqueous enzyme solution containing the same together with undesired proteinaceous impurities which comprises the step of adding a water-soluble calcium salt to said solution in sufficient amount, at least about 0.5% weight/volume of the solution, to precipitate said undesired proteinaceous impurities without precipitating said enzyme from said solution.

2. Process of claim 1, wherein the precipitated impurities are removed and water-miscible organic solvent, which does not dissolve, denature, or inactivate the enzymes, is added to precipitate enzyme from solution.

3. Process of claim 1, wherein said solution contains protease or amylase.

4. Process of claim 3, wherein said solution contains protease or amylase and wherein soluble calcium salt is added in amount of about 1% to 2% weight/volume of the solution.

5. Process of claim 4, wherein said solution contains protease or amylase and wherein said double calcium salt is calcium acetate.

6. Process of claim 1, wherein both amylase and protease are present in said solution and wherein amylase is removed therefrom by addition of water-miscible organic solvent, which does not dissolve, denature, or inactivate the enzymes, the solvent being added in amount sufficient to precipitate amylase but not sufficient to precipitate the protease in said solution.

7. Process of claim 6, wherein said solvent is added to said solution prior ot addition of said soluble calcium salt.

8. Process of claim 6, wherein said solvent is added to said solution concurrently with said soluble calcium salt.

9. Process of claim 6, wherein said solvent is added to said solution subsequent to addition of said soluble calcium salt.

10. Process of claim 9, wherein the precipitate produced upon addition of said soluble calcium salt is removed prior to addition of said solvent.

11. Process of claim 9, wherein an amylase-rich fraction is recovered and additional solvent then added to precipitate protease.

12. Process of claim 10, wherein an amylase-rich fraction is recovered and additional solvent then added to precipitate protease.

13. Process of claim 6, wherein the precipitates from both calcium salt addition and solvent addition are removed and additional solvent added to precipitate protease.

14. Process of claim 13, wherein the solvent is selected from the group consisting of lower-alkanols, lower-alkyl-ketones, and cyclic ethers.

15. Process of claim 13, wherein the solvent is selected from the group consisting of isopropanol and acetone.

16. Process of claim 6, wherein amylase is precipitated by addition of solvent in amount up to about 1 volume of solvent per volume of starting enzyme-containing solution.

17. Process of claim 13, wherein protease is precipitated by addition of solvent in amount of about 1.1 to 2 volumes of solvent per volume of starting enzyme-containing solution.

18. Process of claim 13, wherein amylase is precipitated at a solvent volume of about 0.6 to 1.0 volume per volume of starting enzyme-containing solution, and protease is precipitated at a solvent volume of about 1.1 to 2.0 volumes per volume of starting enzyme-containing solution.

19. Process of claim 13, wherein the procedure is conducted with the solvent and the solution both being at a temperature no greater than about 10 degrees centigrade.

20. Process of claim 13, wherein the solvent is added slowly to a vigorously agitated enzyme-containing solution.

21. Process of claim 1, wherein the starting aqueous solution is a clarified beer from fermentative production of an enzyme mixture by a protease-producing strain of a Bacillus species or an enzyme mixture solution containing enzyme solids recovered from such fermentation and redissolved.

22. Process of claim 21, wherein the enzyme-producing species is a *Bacillus subtilis* strain.

23. Process of claim 6, wherein the starting aqueous solution is a clarified beer from fermentative production of an enzyme mixture by a *Bacillus subtilis* strain or an enzyme mixture containing enzyme solids recovered from a fermentation beer produced by said strain and redissolved, and wherein the solvent is added to a vigorously agitated solution in amount of about 0.6 to 1.0 volume per volume of solution to precipitate amylase and in amount of about 1.1 to 2.0 volumes per volume of solvent to precipitate protease.

References Cited

UNITED STATES PATENTS 3,482,997  12/1969  Murray et al. _____ 195—62X

LIONEL M. SHAPIRO, Primary Examiner